United States Patent [19]

Kamada et al.

[11] Patent Number: 4,686,704
[45] Date of Patent: Aug. 11, 1987

[54] INFORMATION INPUT APPARATUS

[75] Inventors: Hiroshi Kamada, Yamatokoriyama; Sumio Kita, Nara, both of Japan

[73] Assignee: Sharp Kabushiki Kaisha, Osaka, Japan

[21] Appl. No.: 606,535

[22] Filed: May 3, 1984

[30] Foreign Application Priority Data

May 9, 1983 [JP] Japan .................................. 58-82286

[51] Int. Cl.[4] ............................................. G06K 9/20
[52] U.S. Cl. ...................................... 382/61; 235/440
[58] Field of Search ....................... 382/61, 36, 22, 57, 382/68, 62; 235/436, 440, 462

[56] References Cited

U.S. PATENT DOCUMENTS

| 3,578,953 | 5/1971 | Milford et al. | 382/61 |
| 3,760,161 | 9/1973 | Lohne et al. | 382/62 |
| 3,763,467 | 10/1973 | Cash et al. | 382/61 |
| 4,300,123 | 11/1981 | McMillin et al. | 382/61 |
| 4,408,344 | 10/1983 | McWaters et al. | 382/68 |
| 4,538,072 | 8/1985 | Immler et al. | 235/440 |

Primary Examiner—David K. Moore
Assistant Examiner—Jacqueline Todd
Attorney, Agent, or Firm—Birch, Stewart, Kolasch & Birch

[57] ABSTRACT

A sheet information input apparatus for an electronic file system comprises an sheet input device for inputting an image sheet into the apparatus, a sheet recognition device responsive to the input device for judging a type of specific code on the inputted sheet, and an information reading device responsive to the judging device for reading information from the sheet.

1 Claim, 4 Drawing Figures

INFORMATION INPUT APPARATUS

BACKGROUND OF THE INVENTION

The present invention relates to an information input apparatus, and more particularly to an improved information input apparatus for an electronic file system including a sheet type of recognition device which recognizes a specific code on a sheet inputted for reading and inputting information on the sheet.

In a conventional document information input apparatus, an image such as characters or figures on a document sheet are scanned by an optical scanner, and a quantized image produced by scanning is inputted into and read by a central processing unit of a computer or the like.

The above document information input apparatus is suitable for inputting an image contained on the document sheet. However, a key word or a title relating to the inputted information has to be inputted by a manual operation for each document sheet or each predetermined amount of the document sheets for retrieving the inputted images, so that the document information input time is relatively long when the image of each of a number of document sheets are to be inputted. Also, an input device which inputs the specific information such as the title or the key word must be additionally required for retrieving the images of the document sheets stored.

SUMMARY OF THE INVENTION

It is an object of the present invention to provide a sheet type of recognition device for recognizing a specific type of code such as a mark or a character on a sheet.

It is another object of the present invention to provide a sheet information input apparatus including a sheet type of code recognition device for recognizing a specific type of code such as a mark or a character on the sheet.

It is still another object of the present invention to provide an improved code detecting device for recognizing a specific type of code on a sheet for inputting or reading specific sheet information.

It is a further object of the present invention to provide a sheet information input apparatus for an electronic file system including a sheet type of recognition device for determining whether an OMR (Optical Mark Reader) sheet, an OCR (Optical Character Reader) sheet, or a document sheet containing some other type of image or information is inputted.

It is a further object of the present invention to provide a sheet information input apparatus for inputting information for recognizing a specific type of code on a sheet.

It is still a further object of the present invention to provide sheet information input apparatus for inputting diverse information relating to each type of several specific types of code by recognizing each type of code on a sheet.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

According to an embodiment of the present invention, a sheet information input apparatus comprises inputting means for inputting a sheet image into the apparatus, recognition means responsive to the input means for recognizing a specific type of code on the inputted sheet, and reading means responsive to the recognition means for reading sheet information.

The sheet may be selected from one or more optical mark sheets, optical character sheets, or document sheets each containing some image or information.

The sheet information input apparatus, further, includes sheet supply means for automatically supplying each of the sheets to the inputting means.

According to another embodiment of the present invention, a circuit for detecting a type of sheet comprises inputting means for inputting an image sheet code recognition means of the coded information on the sheet, means responsive to the coded information for determining a type of coded information, recognized and means responsive to the type of coded information for determining the type of sheet at said inputting means.

BRIEF DESCRIPTION OF THE DRAWINGS

The present invention will be better understood from the detailed description given hereinbelow and the accompanying drawings which are given by way of illustration only, and thus are not limitative of the present invention and wherein.

DETAILED DESCRIPTION OF THE INVENTION

Figure 1:
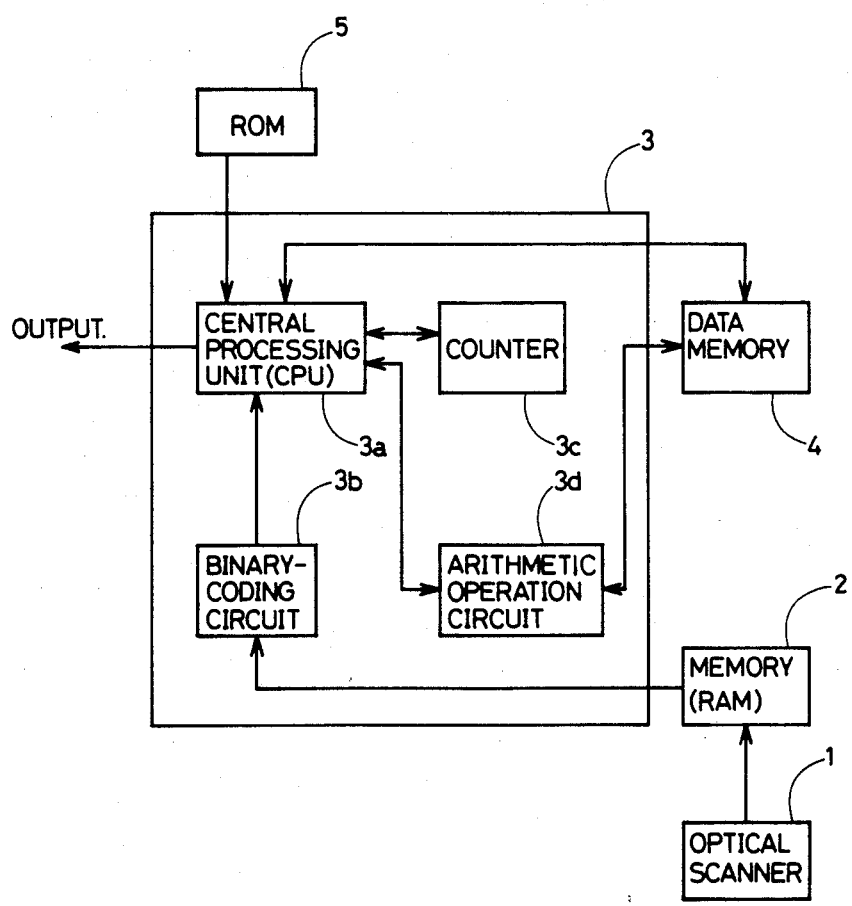
FIG. 1 shows a block diagram of a sheet type of recognition device according to an embodiment of the present invention.

FIG. 1 shows a block diagram of a sheet information input apparatus including a sheet type of recognition device according to an embodiment of the present invention.

The sheet as used herein includes an OMR sheet, an OCR sheet and a document sheet each containing some image or information such as some pattern, For description sake, mainly the document sheet and the OMR sheet are exemplified hereinbelow. Character information recorded on the OCR sheet can be read out by discriminating between the dark character portions from the white sheet background portion in view of light reflection differences at the reader.

A sheet information input apparatus according to an embodiment of the present invention comprises sheet type recognition means for determining whether either a document sheet, an OMR sheet, or an OCR sheet is inputted, document input means for inputting an image of the document sheet, an optical mark reader for inputting specific information such as a key word or a title by reading specific marks on the OMR sheet, and an optical character reader for inputting imformation such as the key word or the title by reading characters on the OCR sheet.

With reference to FIG. 1, an optical scanner 1 comprising a CCD camera scans one page(or a piece) of the sheet transfered. The optical scanner 1 shows a reading resolution of about 12 lines/mm, for example. Information such as an image obtained by scanning the one page (or the piece) of the sheet is converted to electric signals and is stored in a memory 2. In the embodiment of the present invention, the information on the sheet is converted to electric signals with 12(row) ×12(column) picture elements/mm². For example, if the sheet is an A4 size sheet (297 mm×210 mm), 8,981,280 picture elements (297 mm×12 picture elements×210 mm×12 picture elements) are stored in the memory 2.

In response to the memory contents (the information an the page (or the piece of the sheet) of the memory 2, a controller 3 is operated to detect whether the sheet is either of an OMR sheet, an OCR sheet or a document sheet, and the controller 3 outputs the sheet information in accordance with the type of sheet recognized.

The controller 3 comprises a central processing unit (CPU) 3a, a binary-coding circuit 3b, a counter 3c and an operation circuit 3d. Further, the controller 3 is connected with a data memory 4 such as a random access memory (RAM). The central processing unit (CPU) 3a is connected with a read only memory (ROM) 5. Microprocessor "Z-8000" supplied by SHARP CORPORATION, Japan provides the elements of FIG. 1 except the optical scanner 1.

The binary-coding circuit 3b is responsive to the contents of the memory 2 for detecting whether the level of the video signal (the electrical signal) is smaller or greater than that of a constant threshold value, and the video signals (the electric signals) are converted to black codes "1" and white codes "0". If the sheet is the A4 size sheet, 8,981,280 picture elements are converted to black codes "1" and white codes "0".

The CPU 3a is operable to determine whether each of a picture elements is the black code "1" or a white code "0" by searching the sheet in response to the output of the binary-coding circuit 3b.

The counter 3c is operated in response to the operation of CPU 3a to measure a distance from one end of the sheet to a predetermined point for changing the black code "1" to the white code "0", or to a point for changing the white code "0" to the black code "1".

The data memory 4 stores each of the measurement results of the counter 3c, or the calculation results of the arithmetic operation circuit 3d, or the like.

The arithmetic operation unit 3d determines values relating to the specific codes on the OMR sheet, the OCR sheet and the document sheet in response to the contents of the memory 2.

The ROM 5 stores values relating to the size and position of a timing mark M as the specific code of the OMR sheet, or the size or position of a writing zone for writing characters or numericals on the OCR sheet, or the like.

The CPU 3a outputs a sheet type of recognition signal by comparing the calculation results of the arithmetic operation unit 3d or the contents of the memory 4, with the stored values of the ROM 5.

The operation for determining whether the sheet is a document or an OMR sheet will now be described as follows.

Figure 2:
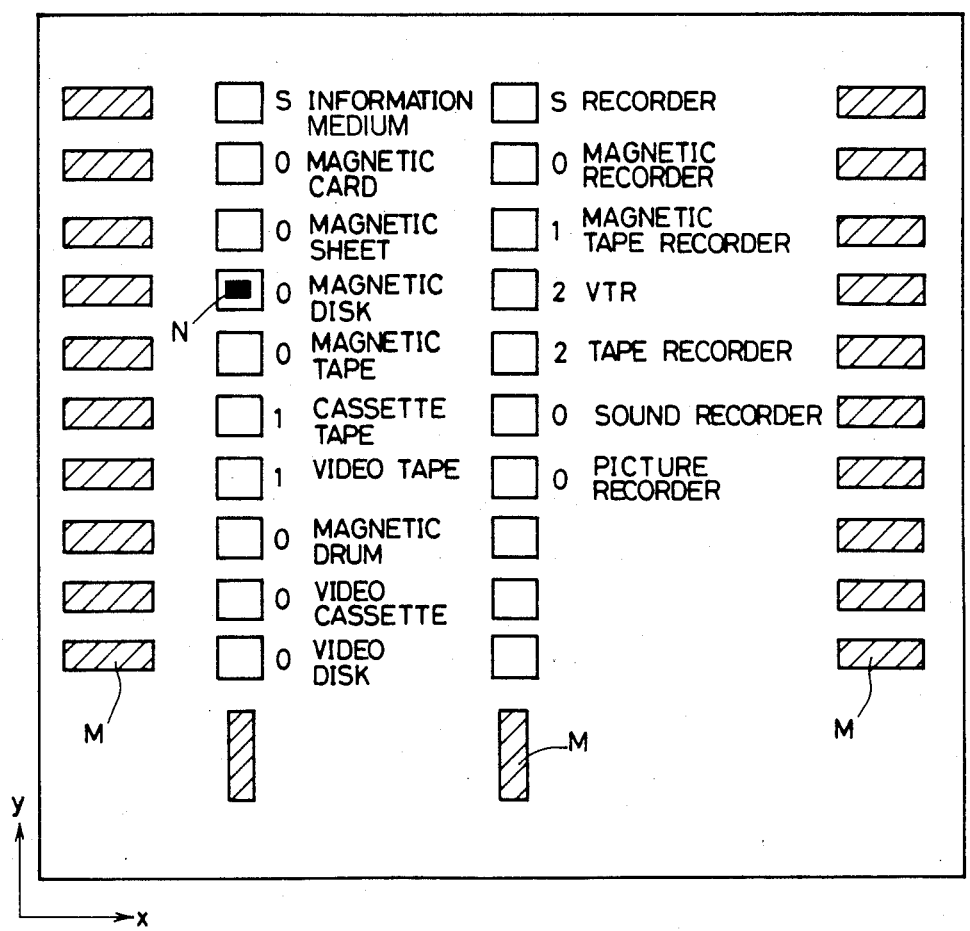
FIG. 2 shows a plan view of an OMR sheet.
Figure 3:
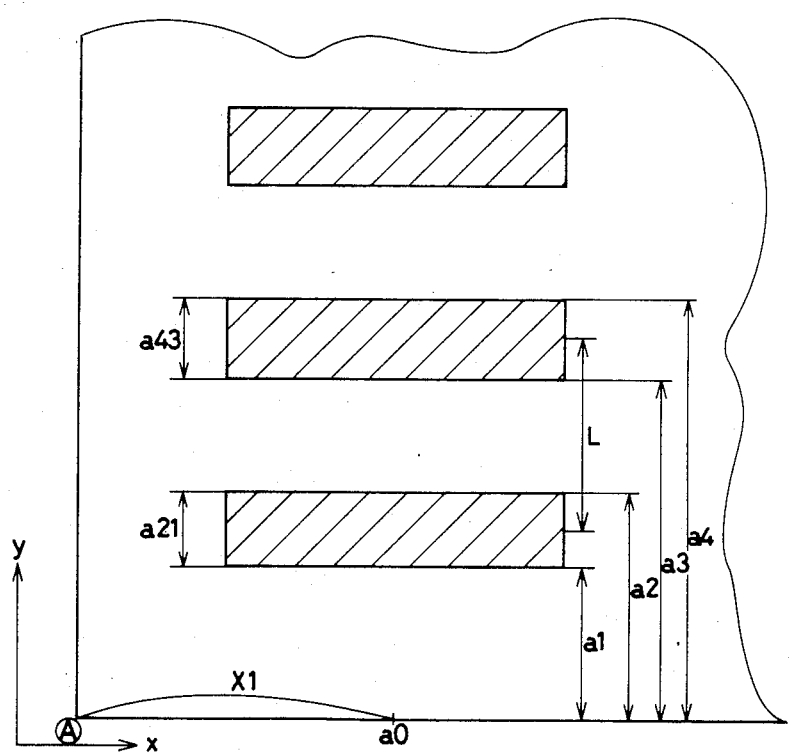
FIG. 3 shows a partially enlarged view of the OMR sheet of FIG. 2.
Figure 4:
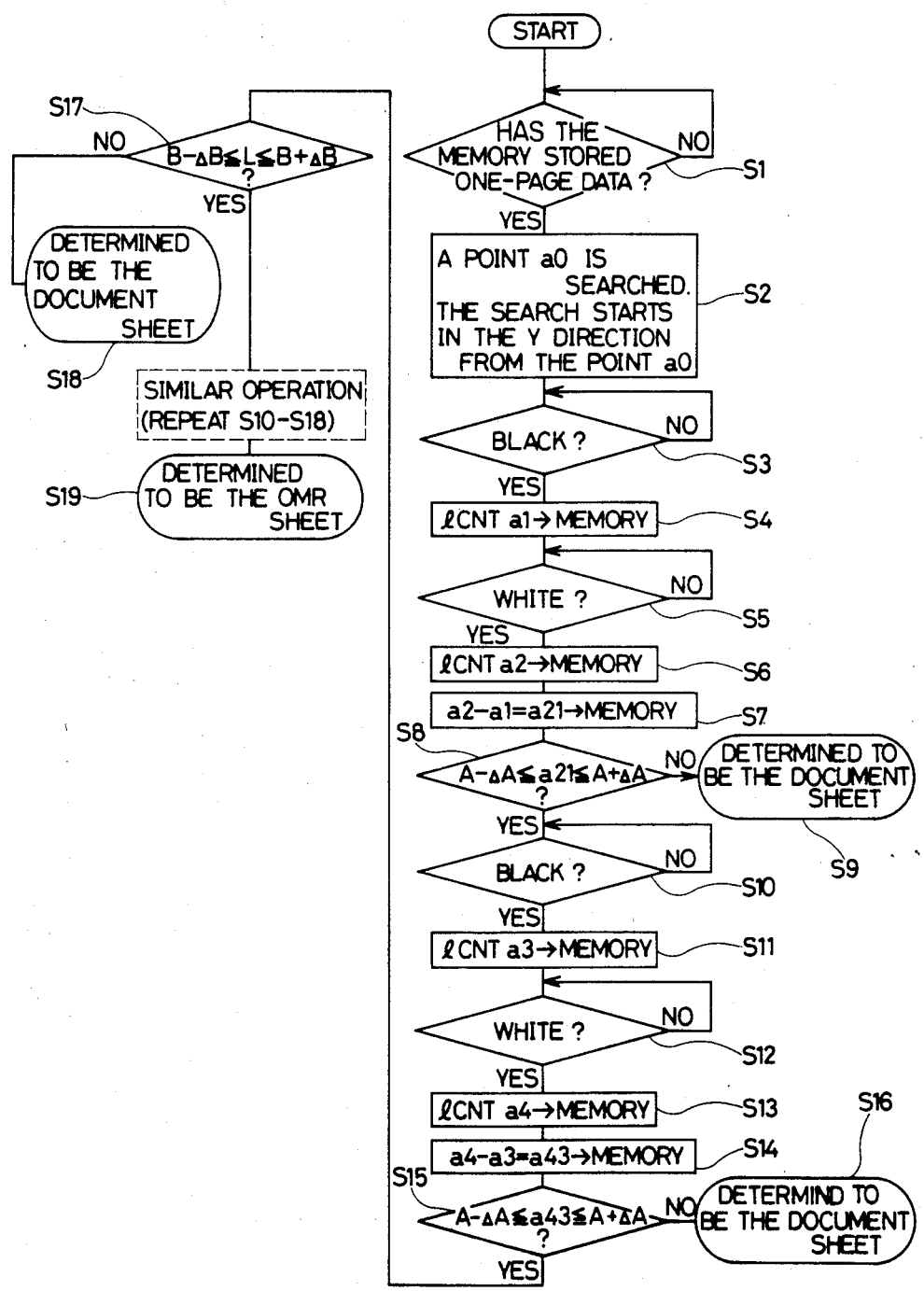
FIG. 4 shows a flow chart for explaining the operation of the invention.

FIG. 2 shows a plan view of an OMR sheet. FIG. 3 shows a partially enlarged view of the OMR sheet of FIG. 2. FIG. 4 shows a flow chart which explains the operation required for determining a sheet type.

Timing marks M on the OMR sheet appear in a read zone in the X (row) direction and in the Y (column) direction. The timing marks M are black, and the timing mark M is thus formed by a pattern of black code "1".

The document sheet does not have timing marks M appearing in showing the read zone, so that the sheet transferred is detected as a document sheet or a OMR sheet by noting whether fixed size timing marks (black marks) form a specific pattern. The type of sheet can be determined accordingly.

Step S1: Information (image) on the one page (or the piece) of the sheet is stored in the memory 2 by the optical scanner 1.

Step S2: A search for a timing mark M starts in the Y direction from the point aO which has a distance X1 along the X direction far from the origin Ⓐ of the sheet. The distance X1 was previously stored in the ROM 5.

Step S3: Step S3 is executed to detect whether a black code "1" for a timing mark M is present or absent on the sheet in response to the output of the binary-coding circuit 3d.

Step S4: If a black code "1" for a timing mark M is present on the sheet, a distance a1 is stored in the data memory 4. The distance a1 is a distance from one edge of the sheet to a point where the white code "0" changes to the black code "1" and is counted by the counter 3c. Further, the search for the timing mark M is continued in the Y direction.

Step S5: Step S5 is next executed to detect whether a white code "0" is present or absent.

Step S6: If a white code "0" is present on the sheet, a distance a2 is stored to the data memory 4. The distance a2 is a distance from the edge of the sheet to a point where the black code "1" changes to the white code "0" and is also counted by the counter 3c.

Step S7: The width a21 ($a_a - a_1$) of the first timing mark M is calculated by the arithmetic operation unit 3d, and is stored into the data memory 4.

Step S8: The CPU 3a is operated to detect whether the width a21 of the first timing mark M is present within a range from a predetermined width $A - \Delta A$ to another predetermined width $A + \Delta A$. For example, $A - \Delta A < a21 \leq A + \Delta A$ where $a21 = a2 - a1$. The predetermined width A of the timing mark M and error $\pm A$ were previously stored into the ROM (Read Only Memory) 5.

Step S9: If the width a21 of the first timing mark M is absent between the widths $A \pm \Delta A$, the sheet is judged to be a document sheet. If the width a21 of the first timing mark M is present between the widths $A \pm \Delta A$, the next step is executed.

Steps S10–S16 corresponds to a report of the steps S3–S9. The steps S10–S16 are operated to detect whether a second timing mark M is present or absent on the sheet. If the second timing mark M is present, a distance a3 from the edge of the sheet, where the white code "0" changes to the black code. Code "1", is measured by the counter 3c, and a distance a4 from the edge of the sheet where the black code "1" changes back to the white code "0" is measured by the counter 3c. When the width a43($a_4 - a_3$) of the second black mark M is present between the widths $A \pm \Delta A$, step 17 is executed.

Step S17: Step S17 is operates to detect whether a distance interval L is present between the center of the width a21 of the first timing mark M and the center of the width a43 of the second timing mark M within a range from a predetermined interval $B - \Delta B$ to another predetermined interval $B + \Delta B$. The predetermined interval B between centers of two timing marks and errors $\pm \Delta B$ has been previously stored in the ROM 5 shown in FIG. 1. For example, $B-\Delta B \leq L \leq B+\Delta B$ where $L=(a43/2+a3)-(a21+a1)$.

Step S18: When the interval L is absent between the intervals $B\pm\Delta B$, the sheet is judged to be a document sheet. If the interval L is present between the intervals $B\pm\Delta B$, a next or third timing mark M is searched by for by again repeating the steps S10-S16. In the step S15 for the third timing mark M, when the width of the third timing mark M is present between the widths $A\pm\Delta A$, the steps S17 and S18 for the third timing mark M are again executed. In the steps S17 and S18 for the third timing mark M, the interval between the center of the width of the second timing mark M and the center of the width of the third timing mark M is compared with the intervals $B\pm\Delta B$.

Although the search for timing marks M is stopped when the sheet is judged to be a document sheet, or when the search of the timing mark M reaches the upper edge of the sheet in the Y direction, the search for a timing mark M is also executed in the X direction by the same operation. The values A, $\pm\Delta A$, B, $\pm\Delta B$ are changed dependent on the size of the timing mark M in the X direction.

In the search of the timing mark M in the X direction, the search of the timing mark M is stopped when the sheet is judged to be a document sheet or the search of the timing mark M reaches the right edge of the sheet in the X direction. When the search of the timing mark M reaches the end of the sheet in the X direction, step S19 is executed.

Step S19: After the foregoing search for the timing marks M is executed in the X and Y directions, the sheet is judged to be an OMR sheet.

The values $\pm\Delta A$ and $\pm\Delta B$ can be selected dependent on printing accuracy of the OMR sheet or the OCR sheet and reading accuracy of the optical scanner 1.

When the sheet has been noted to be the OMR sheet and the OMR sheet detecting signal is outputted from the CPU 3a, the mark position on the OMR sheet is optically read (for example, N) and the mark information is outputted and stored in a predetermined memory according to the ordinary skill in the art.

If a sheet is judged to be a document sheet and the document sheet detecting signal is outputted from the CPU 3a, the image on the document sheet is read and inputted according to the ordinary skill in the art.

In the present invention, an OCR (Optical Character Reader) sheet can be used in place of an OMR sheet. Also, each type of sheet including the OCR sheet, the OMR sheet, and the document can be determined.

If both a document sheet and an OCR sheet are used in the sheet information input apparatus, the document sheet or the OCR sheet can be detected by noting the specific code related to the writing zone on the OCR sheet where characters or numerals are written and can be optically read. Accordingly, when the sheet is noted to be an OCR sheet, an OCR sheet detection signal is outputted from the CPU 3a, and the characters or numerals on the OCR sheet are optically read and inputted into a predetermined memory in accordance with the ordinary skill in the art.

According to the present invention, a sheet supply means may be installed in the optical scanner for automatically feeding sheets and OMR sheets or OCR sheets can be selectively inserted between one or more of a plurality of the document sheets, so that the key word or the title corresponding to each of the plurality of the documents will be automatically inputted.

In a further preferred embodiment of the present invention, a sheet containing both OMR information zone and/or an OCR information zone, and a document image zone can be used.

After the above sheet is inputted into the memory 2 by the optical scanner 1, the controller 3 operates to determine whether the OMR information zone and/or the OCR information zone are/is present or absent on the sheet by detecting the timing marks M in the OMR information zone or the specific code relating to the OCR information zone. The controller 3 is capable of detecting a sheet number recorded on the sheet and assigned to the sheet of the type containing the document image zone and, the OMR information zone and/or the OCR information zone. By reading the sheet number, the sheet presently read is determined to be of the "mixture-type". The ROM 5 can store some necessary information regarding the "mixture-type" sheets. The OMR information zone and/or the OCR information zone can store the key word, the title information while the document image zone can store the image pattern, all on a single sheet. These items of information are outputted as being related to each other.

In the present invention, the coded image is stored in the memory 2 the image obtained by scanning is converted to black codes "1" or white codes "0". The embodiment of the present invention can be used in the electronic file system.

The invention being thus described, it will be obvious that the same may be varied in many ways. Such variations are not to be regarded as a departure from the spirit and scope of the invention, and accordingly all such modifications coming within the scope of the following claims are intended to be included.

What is claimed is:

1. Sheet type of recognition apparatus comprising: optical scanner means for reading a sheet containing optical information and generating electrical information signals therefrom;

a memory for storing said information signals; and a controller coupled to said memory and including a central processing unit, a binary coding circuit, a counter and an arithmetic operation circuit for automatically determining whether said information comprises an OMR code sheet, an OCR code sheet, a document sheet, or a mixture thereof, said controller determines sheet information sequentially in first and second orthogonal directions, said controller senses the occurence of an OMR or OCR code along said orthogonal direction and finding none determines that the sheet comprises a document sheet and in the event one of the said codes is found, causes information contained thereat to be read, said code comprises an OMR code and said controller operates to detect a timing mark on said sheet in X and Y directions by first sensing a dark timing mark in one of said directions, sensing a light portion of the sheet in the same direction, calculating the width dimension of the timing mark, determining whether the width dimension of the timing mark is located within a predetermined region of the sheet, repeating the process for another timing mark, and determining if there is a predetermined separation distance between the timing marks so that a predefined pattern is sensed from which the sheet is judged to be an OMR sheet, otherwise it constitutes a document sheet and then repeating the aforesaid operation for the other of said directions.

* * * * *